S. D. GONSALVES.
FRYING PAN.
APPLICATION FILED APR. 29, 1918.

1,281,943.

Patented Oct. 15, 1918.

Witness
George Huttner

Inventor
Sylvanus D. Gonsalves
By Victor J. Evans
Attorney

UNITED STATES PATENT OFFICE.

SYLVANUS D. GONSALVES, OF NEW BEDFORD, MASSACHUSETTS.

FRYING-PAN.

1,281,943.

Specification of Letters Patent.  Patented Oct. 15, 1918.

Application filed April 29, 1918. Serial No. 231,476.

*To all whom it may concern:*

Be it known that I, SYLVANUS D. GONSALVES, a citizen of the United States, residing at New Bedford, in the county of Bristol and State of Massachusetts, have invented new and useful Improvements in Frying-Pans, of which the following is a specification.

This invention relates to domestic cooking vessels, particularly to frying pans, and has for its object the provision of a frying pan including an outer vessel and a removable form member disposed within and dividing the outer vessel into a plurality of compartments of preferably rectangular configuration, whereby eggs and the like cooked within the compartments will assume a shape suitable for disposition between slices of bread in making sandwiches, without projecting beyond the edges of the bread.

An important object is the provision of a device of this character in which the outermost sides of the form member are spaced from the sides of the outer vessel, whereby after the eggs or the like are cooked upon one side and the form subsequently removed, spaces will exist between the outer edges of the fried material and the outer edges of the vessel, whereby an implement may readily be engaged beneath the fried material in order that it may be turned over with the utmost ease.

Another object is the provision of a device of this character in which the outer vessel and the form member are both provided with separate handles which contact throughout the major portion of their lengths so that they may be grasped as a single handle for moving the device around, the end of the handle of the form member being further provided with an angular tip engageable by the operator's thumb or finger for moving the form member out of engagement with the bottom of the vessel.

A further object is the provision of a frying pan of this character which will be extremely simple and inexpensive in manufacture, efficient and durable in service, and a general improvement of the art.

With the above and other objects and advantages in view, the invention consists in the details of construction to be hereinafter more fully described and claimed, and illustrated in the accompanying drawing, in which:

Figure 1:
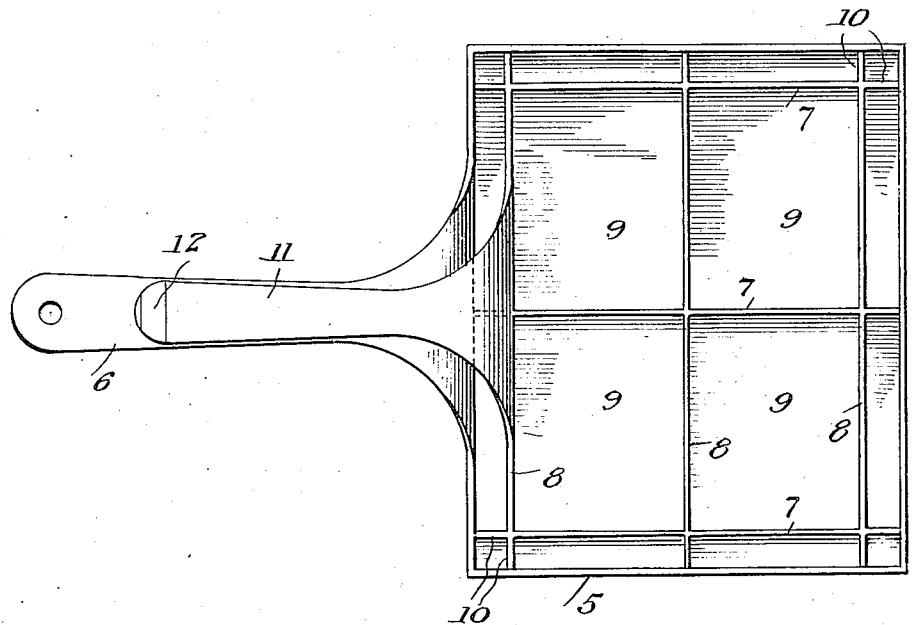
Figure 1 is a plan view of my complete device.
Figure 2:
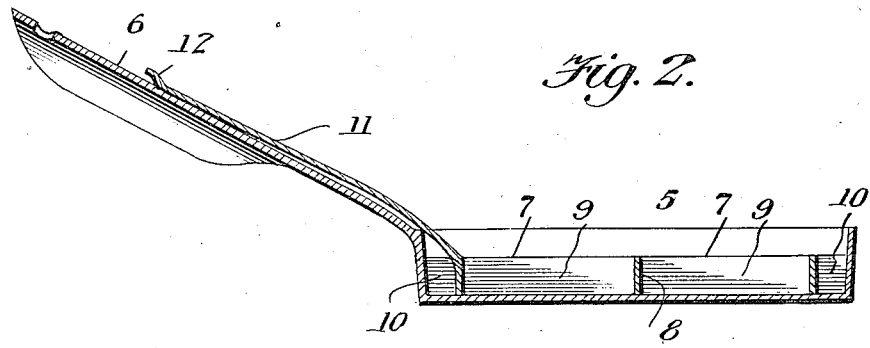
Fig. 2 is a vertical longitudinal sectional view therethrough on the line 2—2 of Fig. 1.

Referring more particularly to the drawings, the numeral 5 designates the outer vessel which is formed preferably rectangular as shown, and which is provided with an upwardly curved handle 6 centrally of one side thereof. Disposed within the vessel 5 is a removable form member which comprises a plurality of longitudinal and transverse strips 7 and 8, respectively, which intersect each other at right angles to provide a plurality of compartments 9. The ends of the strips extend outwardly beyond the outermost faces of the outermost strips which they intersect to provide spacing members 10, the ends of which bear against the inner walls of the vessel 5, as clearly shown in Fig. 1. The form member may be formed in any desired manner from sheet metal or by casting and is provided centrally of one side with a curved handle 11 which is disposed in contacting relation to the handle 6 and which terminates at its extreme outer end in an angular extension 12.

In use the operation of my device is as follows:—

Eggs, either in individual form or in scrambled or omelet form, or any other suitable material, are placed within the compartments 9 whereupon the pan is used in the usual manner. The material when poured into the compartments will naturally conform to the shape thereof, which is of a predetermined configuration and of proper dimensions to agree with standard sized bread slices commonly used for sandwiches. The device may be handled as a single integral structure by grasping both handles owing to the fact that both the handles 6 and 11 contact with each other. After the eggs or other material have been cooked a sufficient degree, that they have become solidified, the handle 11 may be grasped and the form member removed bodily from the vessel 5. The eggs or other material will then still remain upon the bottom of the vessel, and will be in spaced relation to each other and to the walls of the vessel 5. All, or as many as desired, of the cooked portion may then be readily turned. The fact that the outermost strips of the form member are spaced from the walls of the outer vessel facilitates the ready engagement of some convenient implement beneath the fried portions for turning them over.

It will be noted that the extreme outer end of the handle 11 is inclined, as shown at 12, so that it may be engaged by the operator's thumb for tilting the form member out of engagement with the cooked portions.

From the foregoing description and a study of the drawing, it will be apparent that I have thus provided an extremely simple and efficient frying pan whereby different portions of the same material or different materials may be cooked simultaneously in the shape suitable for sandwiches without leaving overhanging edges when placed between bread.

Having thus described my invention what I claim is:

1. A frying pan comprising an outer vessel provided with a handle, and a form member removably disposed within said outer vessel and provided with a handle contacting with said first named handle.

2. A frying pan comprising an outer vessel provided with a handle, and a form member removably disposed within said outer vessel and provided with a handle contacting with said first named handle and having its free end terminating in an upwardly inclined portion.

3. A frying pan comprising an outer vessel rectangular in configuration, and a removable form member disposed therein and including a plurality of intersecting longitudinal and transverse strip members defining compartments, the outermost ends of each of said strip member extending beyond the outer sides of the outermost intersecting strip member, whereby the compartments defined between the strip member will be spaced from the inner walls of said outer vessel.

In testimony whereof I affix my signature.

SYLVANUS D. GONSALVES.